US011996611B2

(12) United States Patent
Borst

(10) Patent No.: US 11,996,611 B2
(45) Date of Patent: May 28, 2024

(54) CONNECTOR ASSEMBLY AND METHOD OF USING SAME FOR CONNECTING CYLINDRICAL HALVES OF A CYLINDRICAL RADOME

(71) Applicant: Tom Borst, Walnut Creek, CA (US)

(72) Inventor: Tom Borst, Walnut Creek, CA (US)

(*) Notice: Subject to any disclaimer, the term of this patent is extended or adjusted under 35 U.S.C. 154(b) by 36 days.

(21) Appl. No.: 17/973,230

(22) Filed: Oct. 25, 2022

(65) Prior Publication Data

US 2023/0395972 A1 Dec. 7, 2023

Related U.S. Application Data

(60) Provisional application No. 63/348,942, filed on Jun. 3, 2022.

(51) Int. Cl.
*H01Q 1/42* (2006.01)
*H01Q 1/40* (2006.01)

(52) U.S. Cl.
CPC ............... *H01Q 1/42* (2013.01); *H01Q 1/405* (2013.01)

(58) Field of Classification Search
CPC ................................ H01Q 1/42; H01Q 1/405
See application file for complete search history.

(56) References Cited

U.S. PATENT DOCUMENTS 5,958,557 A * 9/1999 Naor ........................ H01Q 1/42 250/517.1
9,377,046 B1 * 6/2016 Lackey ................. F16B 37/122

FOREIGN PATENT DOCUMENTS

WO WO-2018228415 A1 * 12/2018 ........... H01Q 1/1228

* cited by examiner

*Primary Examiner* — Hoang V Nguyen
(74) *Attorney, Agent, or Firm* — James E. Brunton

(57) ABSTRACT

A radome constructed from a plurality of interconnectable segments and a novel connector assembly for use in connecting together the radome segments.

9 Claims, 2 Drawing Sheets

CONNECTOR ASSEMBLY AND METHOD OF USING SAME FOR CONNECTING CYLINDRICAL HALVES OF A CYLINDRICAL RADOME

CROSS-REFERENCE TO RELATED APPLICATIONS

This is a Non-Provisional Application claiming the benefit of Provisional Application No. 63/348,942 filed Jun. 3, 2022.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to radomes. More particularly, the invention concerns a novel radome that is constructed from a plurality of interconnectable segments of a material that is transparent to radio waves.

Discussion of the Prior Art

A radome is a waterproof structural enclosure that protects a radar system or antenna. The radome is generally constructed from a plurality of segments of fiberglass material that are interconnected by mechanical connectors. In the past, the prior art connectors have proven to be unsatisfactory in use and prone to failure. It is this deficiency that the novel connector assembly of the present invention seeks to overcome by providing a connector assembly that is easy to use and one that reliably and securely interconnects together the segments of the radome.

SUMMARY OF THE INVENTION

With the foregoing in mind, a primary object of the present invention is to provide a radome constructed from a plurality of interconnectable segments and a novel connector assembly for use in connecting together the radome segments.

Another object of the invention is to provide a method for assembling the radome described in the preceding paragraph.

Another object of the invention is to provide a connector assembly of the aforementioned character that overcomes the deficiency of prior art methods and apparatus for interconnecting radome segments.

Another object of the invention is to provide a radome and connector assembly of the character described in the preceding paragraphs that is of a simple saturable construction and is highly reliable in operation.

Yet another object of the invention is to provide a connector assembly that is easy to use by unskilled workmen and one that requires no special tooling for use.

These and other objects of the invention will become apparent from the description of the invention that follows.

DESCRIPTION OF THE INVENTION

Figure 1:
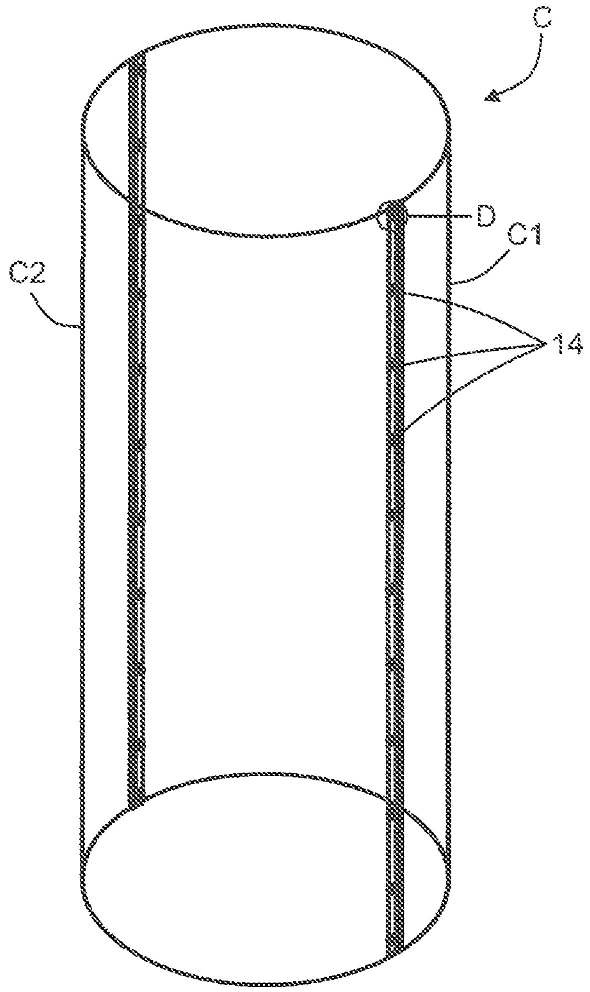
FIG. 1 is a generally perspective view of a cylindrically shaped radome the two halves of which are connected by connecter assemblies of the present invention.
Figure 3:
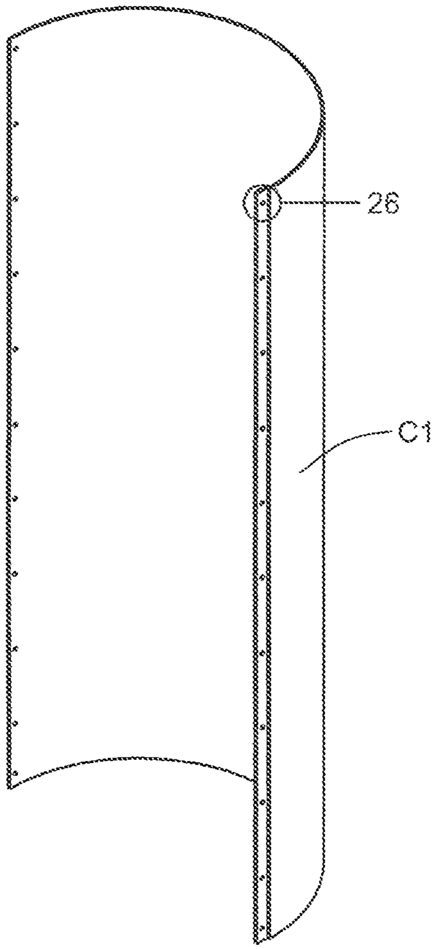
FIG. 3 is a generally perspective view of a cylinder half of the cylindrically shaped radome shown in FIG. 1.
Figure 2:
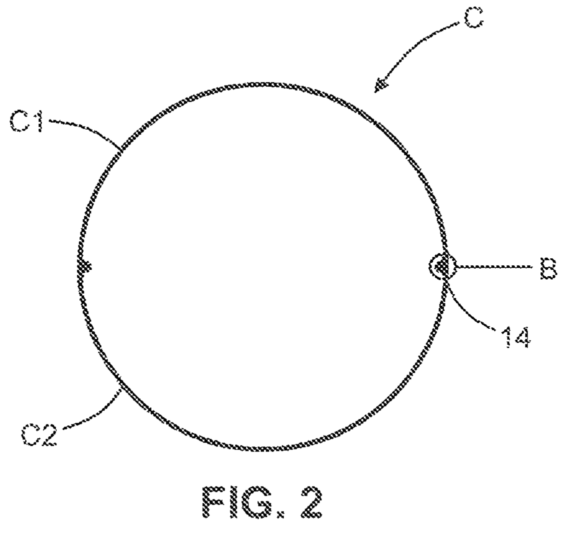
FIG. 2 is a top plan view of the cylindrically shaped radome shown in FIG. 1.
Figure 4:
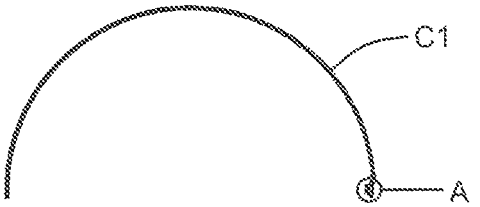
FIG. 4 is a top plan view of the cylinder half shown in FIG. 3.
Figure 5:
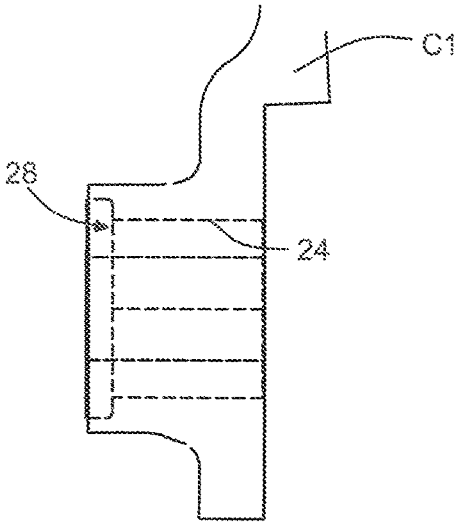
FIG. 5 is a greatly enlarged view of the area designated in FIG. 4 as "A".
Figure 6:
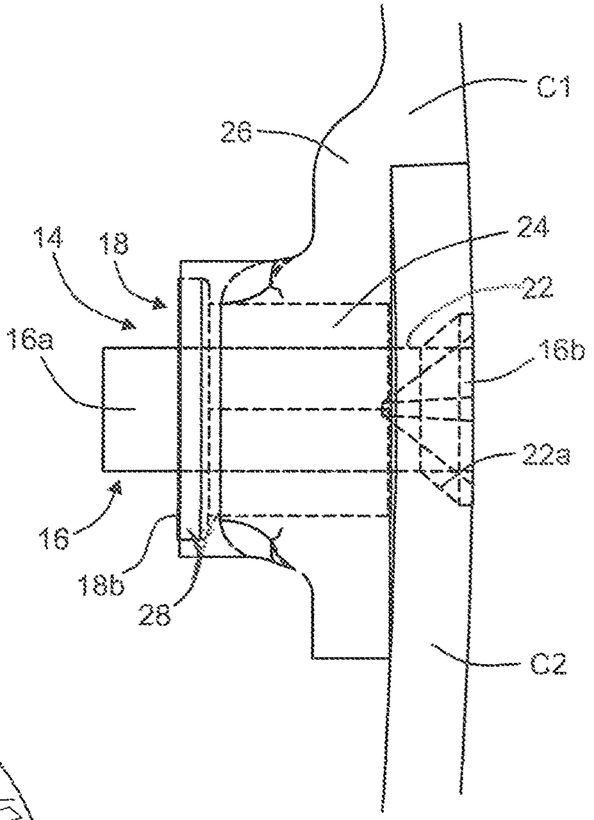
FIG. 6 is a greatly enlarged view of the area designated in FIG. 2 as "B" showing one form of a connector assembly of the present invention.

Referring to the drawings and particularly to FIGS. 1 and 2, one form of the radome of the present invention is there shown and generally designated by the numeral "C". Radome "C" is generally cylindrical in shape and here comprises first and second generally cylindrical walls C1 and C2. One form of the connector assemblies of the present invention, generally designated by the numeral 14, are used to connect the walls. More particularly, as shown in FIG. 1 of the drawings, a plurality of connector assemblies 14 are mounted substantially equidistant to each other along the entire inner perimeter of the radome "C" and on the curved inside surface thereof. In the present form of the invention, each connector assembly 14 comprises bolt 16 and an interior threaded flange nut 18 to which the bolt is connected. Bolt 16 is receivable within bore 22 of the second wall C2 of a selected radome segment. Bolt 16 has an exterior threaded body 16*a* (FIG. 9) and a cross slot head 16*b* that is connected to body 16*a*. Head 16*b* is receivable within a beveled countersink 22*a* formed within second wall C2 (FIG. 6). When in use, body portion 18*a* of flange nut 18 is embodied within a cavity 24 formed within a protuberance 26 of first wall C1. Also, flanged base 18*b* of flange nut 18 is embodied within a sub-cavity 28 formed within protuberance 26 of wall C1 (FIG. 6).

Figure 7:
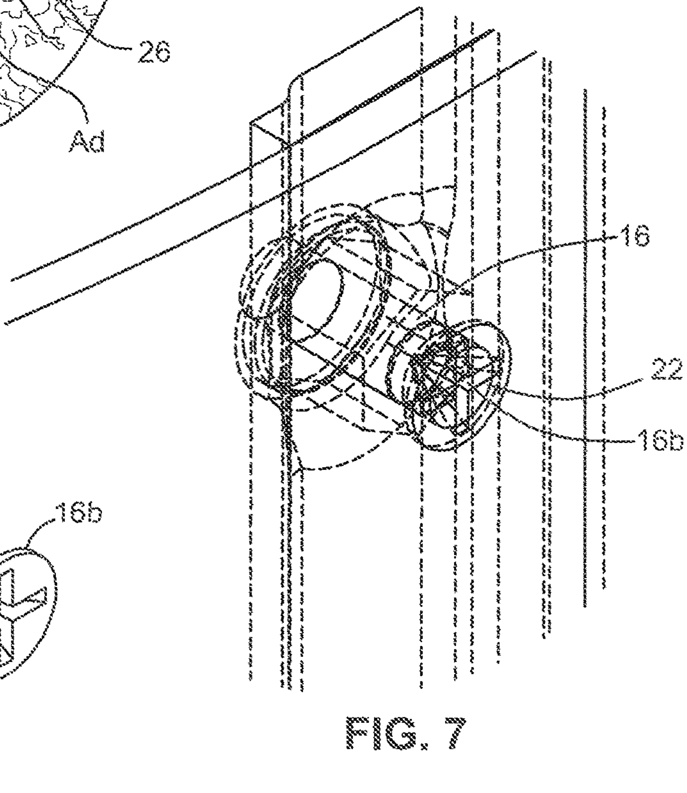
FIG. 7 is a greatly enlarged isometric view of the connector assembly of the present invention that is located in the area designated in FIG. 1 as "D".

The method of the invention for interconnecting together the cylindrical halves C1 and C2 of a radome C includes the following steps:

With the cylindrical halves C1 and C2 mated with each other in the manner shown in FIGS. 6 and 7 of the drawings, threaded bolt 16 is inserted into the counterbore 22*a* and through cavity 24 to a position wherein the end 16*a* of the bolt extends outwardly from the protuberance 26 of cylinder half C1 in the manner shown in FIG. 6. Next, the flanged nut 18 is threadably connected to the end 16*a* of the bolt with the washer like flanged base 18*b* thereof extending outwardly.

Next, the nut is threaded inwardly of the bolt to a position wherein the washer like flanged base 18*b* reside entirely within the sub-cavity 28 formed in protuberance 26. This done, using an appropriate Phillips head screwdriver, the bolt is rotated in a manner to ensure that base 18*b* is snugly tightened against the protuberance 26.

Figure 9:
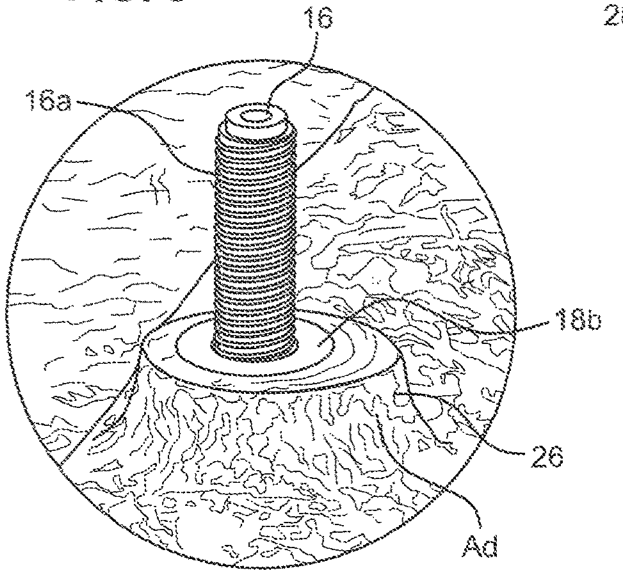
FIG. 9 is a generally perspective view of one form of the connector assembly of the present invention as it appears when connecting the cylinder halves of a cylindrically shaped radome and after being encapsulated within a flowable fluid such as an adhesive.
Figure 8:
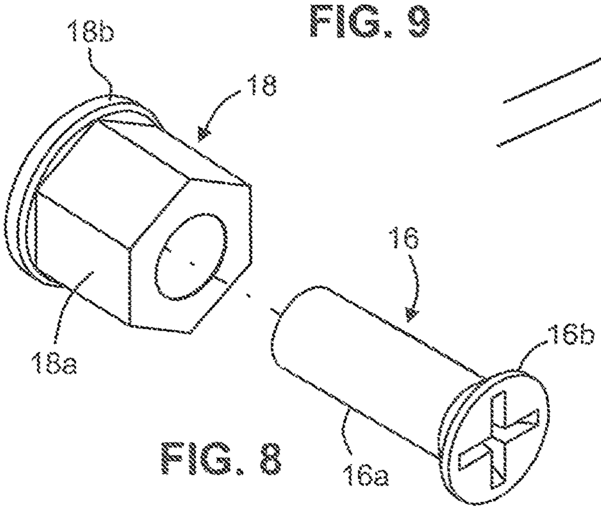
FIG. 8 is a generally perspective exploded view of one form of the connector assembly of the present invention.

Finally, as illustrated in FIG. 9 of the drawings, after base 18*b* is securely tightened against 26, the upper portion of protuberance 26 along with the upper surface of the washer like flanged base 18*b* are encapsulated within a suitable liquid adhesive "Ad".

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A radome comprising:

(a) a plurality of interconnectable radome segments, each segment comprising:

(i) a first wall having a protuberance having a cavity; and (ii) second wall interconnectable with said first wall, said second wall having a bore terminating in a beveled countersink; and (b) a plurality of connector assemblies for use in connecting together said first and second walls of said radome segments, each said connector assembly comprising:

(i) a bolt receivable within said bore of said second wall of a selected radome segment, said bolt having a body having an exterior thread and a head connected to said body; and (ii) a nut threadably connected to said bolt, said nut having an interiorly threaded body portion receivable within said cavity of said protuberance of a selected radome segment.

2. The radome as defined in claim 1 in which said protuberance has a sub-cavity and in which body portion of said nut has a washer like flanged base receivable within said sub-cavity of said protuberance.

3. The radome as defined in claim 1 in which said head of said bolt is provided with a cross slot.

4. The radome as defined in claim 1 further including a flowable material encapsulating a portion of said nut.

5. The radome as defined in claim 1 in which the nut of each said connector assembly is generally rectangular in cross section.

6. An apparatus for connecting the parts of a cylindrically shaped radome of the character having a first wall having a protuberance having a cavity and second wall interconnectable with said first wall, said second wall having a bore terminating in a beveled countersink, said apparatus comprising:

(a) a bolt receivable within the bore of the second wall said bolt having an exterior thread and a cross slot head; and (b) a nut receivable within the cavity of the protuberance of the second wall, said nut having an interiorly threaded body portion and a washer like flanged base.

7. The apparatus as defined in claim 6 in which said nut is generally rectangular in cross section.

8. A method for connecting the parts of a cylindrically shaped radome of the character having a first wall having a protuberance having a cavity and a second wall interconnectable with the first wall, the second wall having a bore terminating in a beveled countersink, said method comprising the steps of:

(a) inserting a threaded bolt having a head and an end into the bore of the first wall to a position wherein the end extends outwardly from the protuberance of the first wall;

(b) threadably connecting a flanged nut having washer like flanged base to said bolt;

(c) threading said flanged nut inwardly of said bolt to a position wherein said washer like flanged base engages the protuberance of the first wall and resides within the cavity of the protuberance; and (d) rotating said flanged nut to tighten said flanged base of said nut against the protuberance.

9. The method as defined in claim 8 including the further step of covering said washer like flanged base of said nut with a flowable liquid.

* * * * *